United States Patent
Silverstein et al.

(10) Patent No.: US 10,583,915 B2
(45) Date of Patent: Mar. 10, 2020

(54) AIRCRAFT SPOILER LOCKOUT

(71) Applicant: The Boeing Company, Chicago, IL (US)

(72) Inventors: Mitchell Silverstein, Mercer Island, WA (US); Ken Pavletich, Renton, WA (US); Mark Noel C. Limon, Renton, WA (US)

(73) Assignee: The Boeing Company, Chicago, IL (US)

( * ) Notice: Subject to any disclaimer, the term of this patent is extended or adjusted under 35 U.S.C. 154(b) by 342 days.

(21) Appl. No.: 15/729,985

(22) Filed: Oct. 11, 2017

(65) Prior Publication Data
US 2019/0106200 A1    Apr. 11, 2019

(51) Int. Cl.
*B64C 13/14*    (2006.01)
*B64C 13/04*    (2006.01)

(52) U.S. Cl.
CPC .......... *B64C 13/14* (2013.01); *B64C 13/0425* (2018.01)

(58) Field of Classification Search
CPC ....... B64C 13/14; B64C 13/0425; B64F 5/40; G06F 3/0482; G06F 3/04847; G06K 15/1805; G06K 15/028; G06K 15/022; G06K 2215/0097; G09G 2340/0464; G09G 5/14
See application file for complete search history.

(56) References Cited

U.S. PATENT DOCUMENTS

| | | | |
|---|---|---|---|
| 9,352,944 B2 | 5/2016 | Fagan et al. | |
| 9,663,220 B2* | 5/2017 | Milad | B64C 13/14 |
| 9,957,057 B2* | 5/2018 | Ferreira | B64D 31/04 |
| 2008/0092609 A1* | 4/2008 | Markbreit | E05B 67/383 |
| | | | 70/254 |

OTHER PUBLICATIONS

Lockout-Tagout in Aerospace; ECS Services; https://www.escservices.com/2013/08/12/lockout-tagout-in-aerospace/; Accessed on Oct. 11, 2017.
Peerless Electronics Inc.; http://www.peerlesselectronics.com/store/brands/MASTER-LOCK.html; Accessed on Oct. 11, 2017.

* cited by examiner

*Primary Examiner* — Medhat Badawi
*Assistant Examiner* — Vicente Rodriguez
(74) *Attorney, Agent, or Firm* — Duft & Bornsen, PC

(57) ABSTRACT

Systems and methods are provided for aircraft spoiler lockout. One embodiment is a system that includes a locking device that removably engages a control member inside a cockpit of an aircraft. The locking device restricts motion of the control member to prevent movement of wing surfaces of the aircraft. The system further includes a controller in communication with a wireless transmitter. The controller determines from a signal sent by the wireless transmitter whether both handheld switches connected to the wireless transmitter are being actively held. If so, the controller directs a supply of power to the locking device thereby causing the locking device to temporarily release the control member. Otherwise, the locking device restricts motion of the control member.

20 Claims, 9 Drawing Sheets

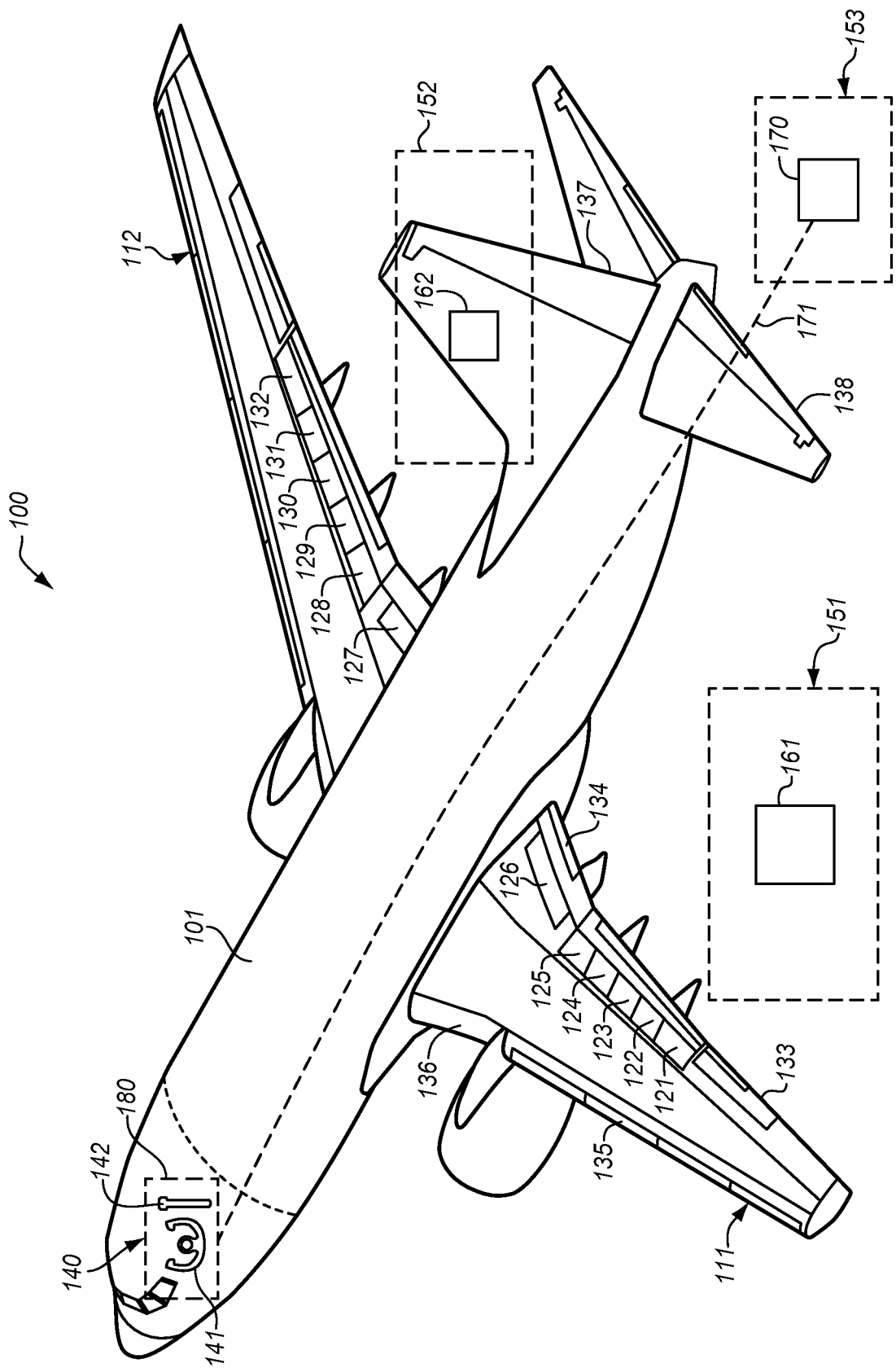

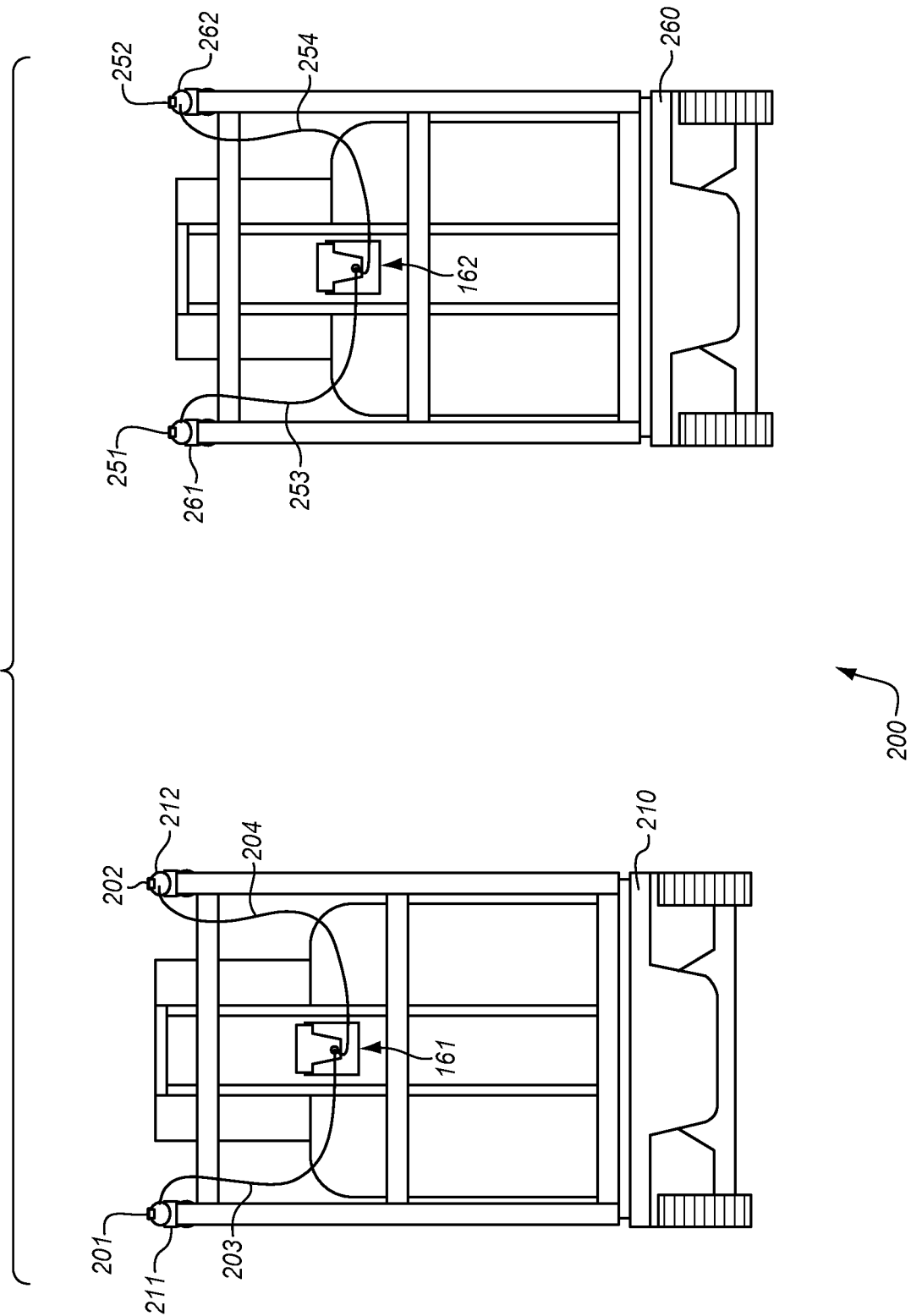

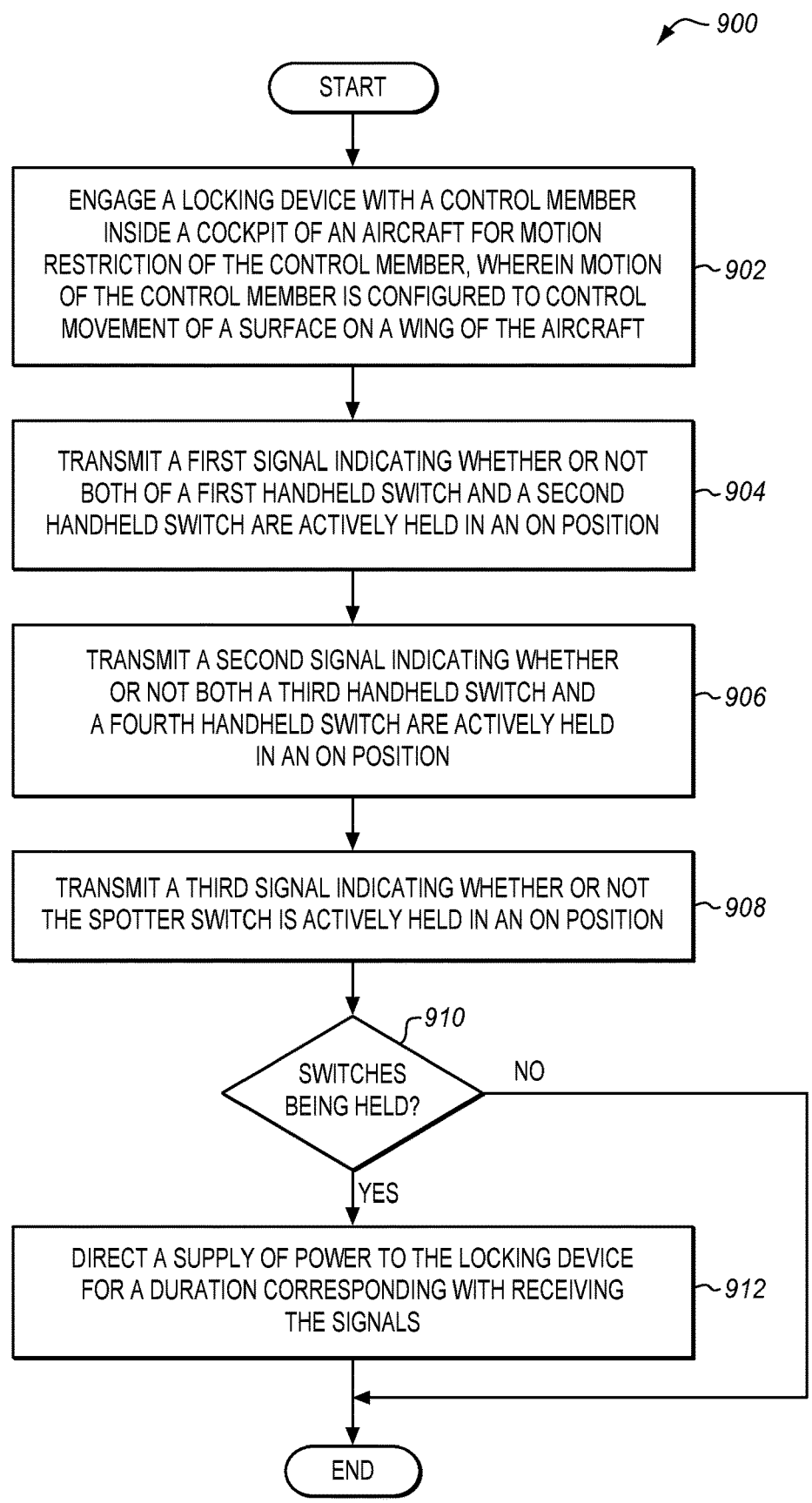

AIRCRAFT SPOILER LOCKOUT

FIELD

The disclosure relates to the field of aircraft, and in particular, to aircraft flight control surfaces.

BACKGROUND

Aircraft wings include spoilers which can extend upward from the top surface of the wing into the airflow to reduce lift and increase drag. The spoilers are actuated from controls in the cockpit of the aircraft. During aircraft assembly or maintenance, wing technicians radio back and forth with a person inside the cockpit to move the spoilers as needed. Aircraft manufacturers and technicians continue to desire safety enhancements for working near spoilers of an aircraft.

SUMMARY

Embodiments described herein provide aircraft spoiler lockout. An electronically controlled locking tool is installed on a speedbrake lever to prevent input to the aircraft spoilers. The locking tool unlocks when five momentary switches (two in each lift and one at the spotter) are depressed. The switches are positioned such that the lift operators are ensured to be clear of the spoilers to activate the switches. The spotter confirms clearance and holds the last momentary switch. At this time, the flight deck operator is able to reposition the speedbrake lever for rigging. The locking tool locks the speedbrake lever in place if any one of the switches is released.

One embodiment is a system that includes a locking device configured to removably engage a control member inside a cockpit of an aircraft for motion restriction of the control member, wherein motion of the control member is configured to control movement of a surface on a wing of the aircraft. The system also includes a first wireless transmitter configured to electronically couple with a first handheld switch and a second handheld switch, and to transmit a first signal indicating whether both the first handheld switch and the second handheld switch are actively held in an on position. The system further includes a controller configured to communicatively couple with the first wireless transmitter, to determine from the first signal that both the first handheld switch and the second handheld switch are actively held in the on position, and to direct a supply of power to the locking device for a duration corresponding with receiving the first signal indicating that both the first handheld switch and the second handheld switch are actively held in the on position. The locking device is configured to release the motion restriction of the control member for the duration of receiving the supply of power.

Other exemplary embodiments (e.g., methods and computer-readable media relating to the foregoing embodiments) may be described below. The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 1 is a diagram of an aircraft maintenance system in an illustrative embodiment.

FIG. 2 illustrates a view of a first transmitter unit and a second transmitter unit in an illustrative embodiment.

FIG. 9 is a flowchart of a method for controlling a locking device in an illustrative embodiment.

DESCRIPTION

Figure 3A:
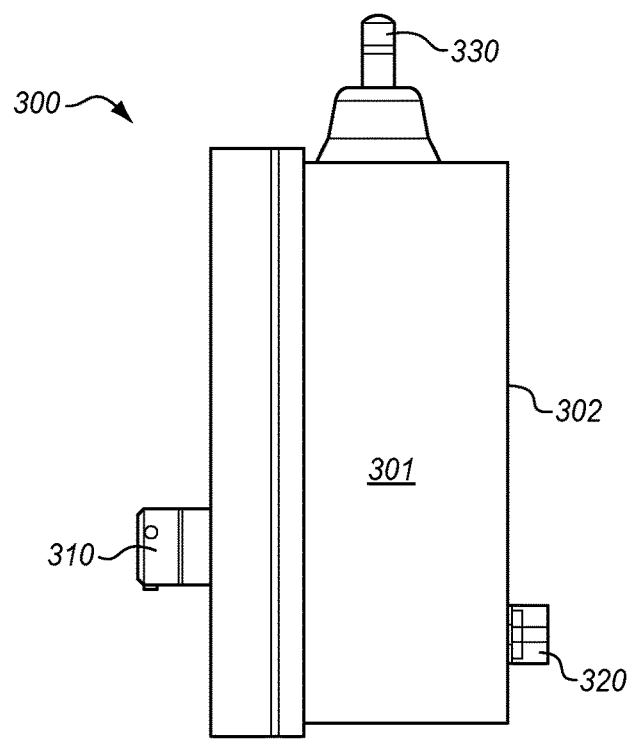
FIG. 3A illustrates a side view of a transmitter unit in an illustrative embodiment.

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

FIG. 1 is a diagram of an aircraft maintenance system 100 in an illustrative embodiment. The aircraft maintenance system 100 includes an aircraft 101 having wings 111-112 with a plurality of flight control surfaces. Particularly, the wings 111-112 include spoilers 121-132, ailerons 133, trailing edge flaps 134, leading edge slats 135, and leading edge flaps 136. Additional flight control surfaces may include a rudder 137 on the tail and elevators 138 on the stabilizers of the aircraft 101.

The flight control surfaces are controlled by control members in a cockpit 140 of the aircraft 101. Examples of control members include a control wheel 141 and a speedbrake lever 142. The control members may be actuated by personnel inside the cockpit 140 to move the control surfaces of the aircraft 101. That is, the motion of the control member (e.g., speedbrake lever 142) causes a corresponding movement of a surface on a wing of the aircraft (e.g., spoilers 121-132). The control member may be coupled with flight control surfaces via hydraulic, mechanical, and/or electrical systems of the aircraft 101.

To perform maintenance procedures on the wings 111-112 of the aircraft 101, personnel and technicians may be situated inside the cockpit 140, at a first work zone 151 proximate to the first wing 111, a second work zone 152 proximate to the second wing 112, and a spotter zone 153 that has a view of the first work zone 151 and the second work zone 152. In prior systems, the workers in each zone communicate over radio to ensure that technicians in the first work zone 151 and the second work zone 152 have their hands sufficiently clear from the flight control surfaces (e.g., spoilers 121-132) when the flight control surfaces are actuated up or down by personnel in the cockpit 140.

The aircraft maintenance system 100 is enhanced to include a first transmitter unit 161, a second transmitter unit 162, a locking control unit 170, and a locking device 180. In general, the locking device 180 is configured to removably engage a control member (e.g., the speedbrake lever 142) inside the cockpit 140 to restrict the motion of the control member and thus prevent movement of the flight control surfaces. The locking device 180 is also configured to temporarily release the control member by command of the locking control unit 170 which uses inputs received from the first transmitter unit 161 and the second transmitter unit 162 to determine whether it is safe for the control member to be moved for actuating a flight control surface. If safety conditions are met, the locking control unit 170 is configured to allow the locking device 180 to temporarily release the control member by temporarily supplying power to the locking control unit 170 via a power cable 171. The locking device 180, locking control unit 170, and the transmitter units 161-162 thus provide a technical benefit by preventing movement of the flight control surfaces unless personnel is confirmed to be sufficiently clear.

FIG. 2 illustrates a view 200 of the first transmitter unit 161 and the second transmitter unit 162 in an illustrative embodiment. The transmitter units 161-162 may be attached to respective lifts 210/260 that include wheels and provide a moving platform/basket for aircraft technicians. Furthermore, each of the transmitter units 161-162 may be communicatively/electrically coupled with handheld switches 201-202 and 251-252 via cables 203-204 and 253-254. The handheld switches 201-202 and 251-252 may also be attached to respective lifts 210/260 at handrails 211-212/261-262 of the lifts 210/260. The handheld switches 201-202 and 251-252 are momentary switches that remain in an on state as long as they are being actuated (e.g., pressed, held, etc.). As such, the transmitter units 161-162 may each be configured to emit a signal indicating whether or not both of its connected switches are being actively held in an on position. The emitted signal may therefore be used to ensure that both hands of a technician are sufficiently clear from flight control surfaces of the aircraft 101.

FIG. 3A illustrates a side view 300 of a transmitter unit 301 in an illustrative embodiment. The transmitter unit 301 may be one of the first transmitter unit 161 or the second transmitter unit 162 described above. The transmitter unit 301 includes a housing 302, a cable interface 310, a push button 320, and an antenna 330.

Figure 3B:
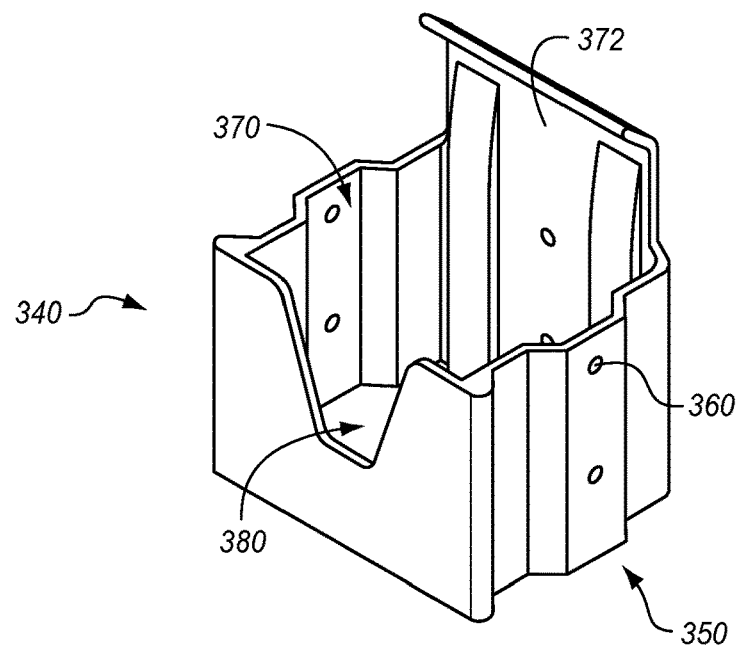
FIG. 3B illustrates a perspective view of a transmitter holder in an illustrative embodiment.

FIG. 3B illustrates a perspective view 340 of a transmitter holder 350 in an illustrative embodiment. The transmitter holder 350 includes one or more attachment points 360 (e.g., screw holes) to attach the transmitter holder 350 to a wall or rail of the lifts 210/260. The transmitter holder 350 further includes a basket 370 having dimensions corresponding with the housing 302 of the transmitter unit 301. When the transmitter unit 301 is situated in the basket 370, the push button 320 is pressed via a back wall 372 of the basket 370. The transmitter unit 301 may be configured to transmit signals based on whether the push button 320 is actively pressed to indicate that the transmitter unit 301 is secured at an intended location (e.g., the first work zone 151 or the second work zone 152) in the aircraft maintenance system 100. The transmitter holder 350 may also include a notch 380 for securely attaching cables to the cable interface 310.

Figure 4A:
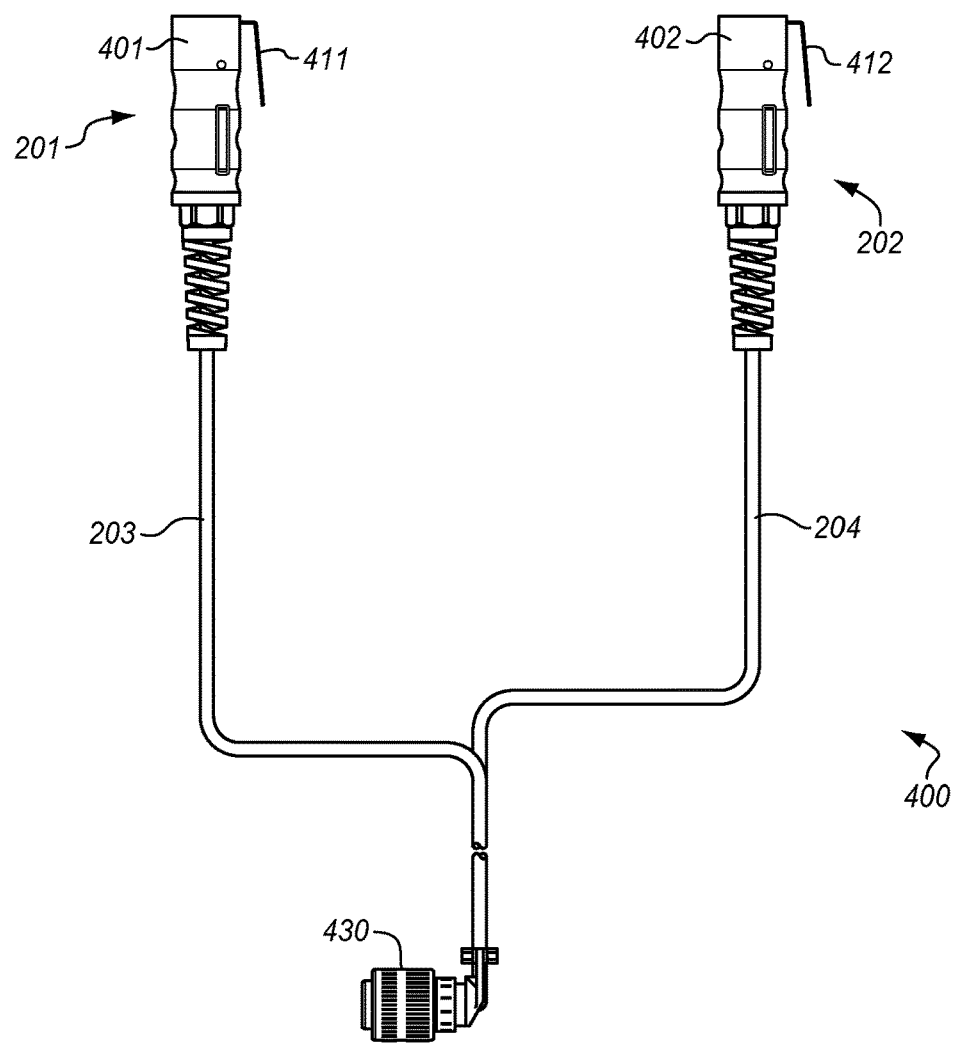
FIG. 4A illustrates a top view of handheld switches in an illustrative embodiment.

FIG. 4A illustrates a top view 400 of the handheld switches 201-202 in an illustrative embodiment. Each of the handheld switches 201-202 includes a pendant body 401-402 with a trigger 411-412 that actuates a signal when pressed against the pendant body 401-402. By default (e.g., when not being actively pressed by a thumb or hand) the trigger 411-412 does not make electrical contact thereby indicating an off state. The cables 203-204 terminate at a cable connector 430 configured to connect with the cable interface 310 of the transmitter unit 301.

Figure 4B:
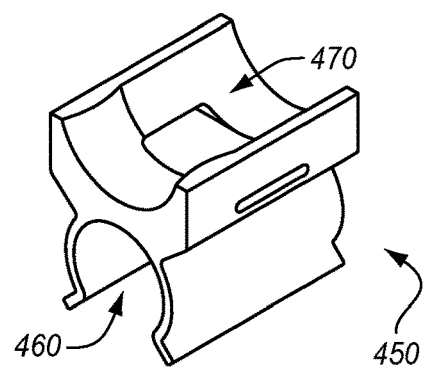
FIG. 4B illustrates a perspective view of a handle attachment in an illustrative embodiment.

FIG. 4B illustrates a perspective view of a handle attachment 450 in an illustrative embodiment. The handle attachment 450 includes a first indentation 460 to grasp a guard rail of a lift, and a second indentation 470 to grasp a pendant body 401-402 of one of the handheld switches 201-202. The handheld switches 201-202 may therefore be secured on either side of a technician (e.g., left side and right side) of the lifts 210/260.

Figure 5:
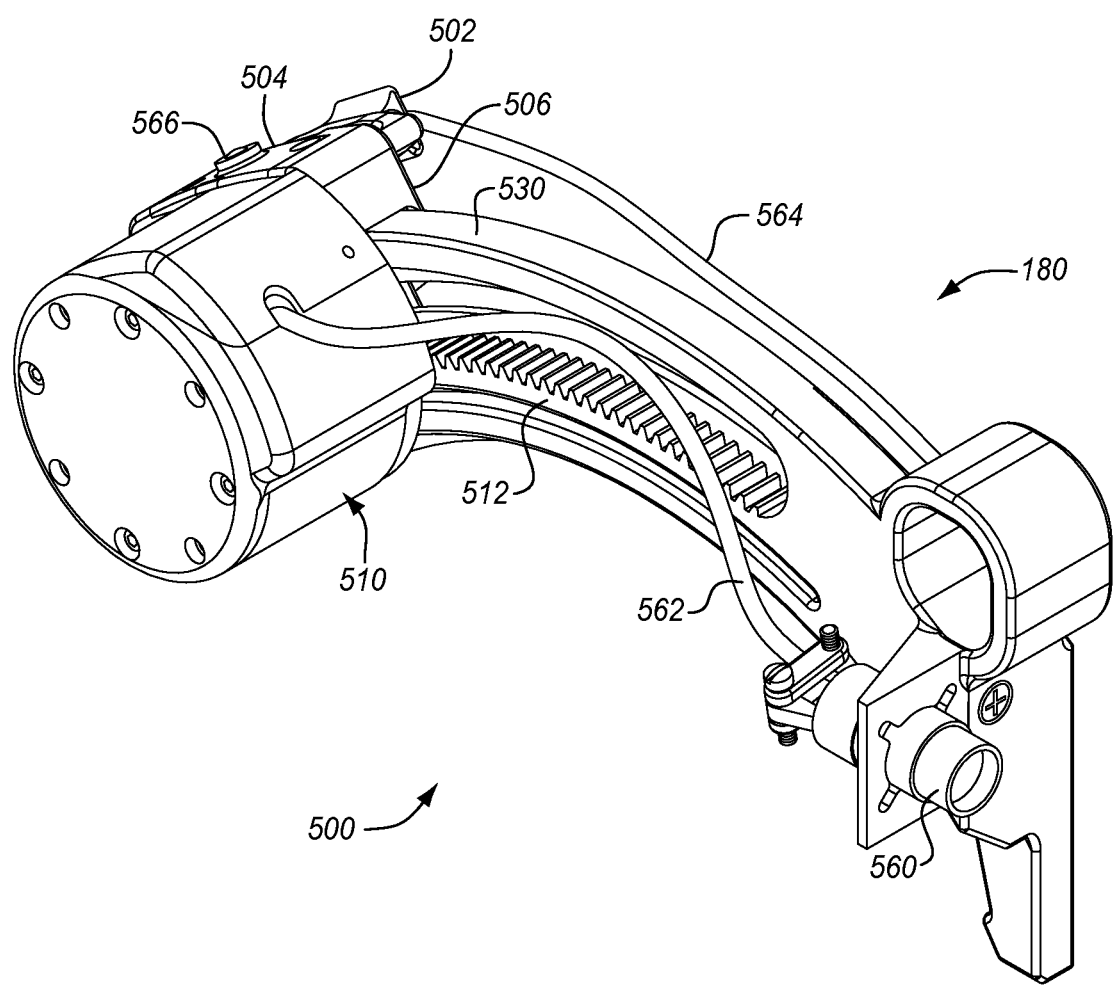
FIG. 5 is a perspective view of a locking device in an illustrative embodiment.

FIG. 5 is a perspective view 500 of the locking device 180 in an illustrative embodiment. The locking device 180 is configured to be temporarily installed onto a control member in the cockpit 140 of the aircraft 101 to prevent inadvertent input to the flight control surfaces during maintenance. The locking device 180 includes a locking clip 502 configured to releasably connect with a block 504 at a locking clip interface 506. With the locking clip 502 secured around the control member and in the block 504 in this manner, a shaft brake 510 mechanically coupled with a gear 512 and attached to the block 504 is configured to prevent or allow a sliding motion of the block 504 along a slide 530 and thus prevent or allow actuation of the control member by personnel in the cockpit 140.

The shaft brake 510 may be powered via a power wire 562 and a power cable interface 560 configured to connect with an external power source/cable (e.g., via the power cable 171). By default, when no power is received at the shaft brake 510, a Light Emitting Diode (LED) indicator 566 indicates a locked state (e.g., is off or red) and the current position of the block 504 (and therefore the control member) is imposed such that an external force cannot actuate the control member. In response to a power input, the LED indicator 566 indicates an unlocked state (e.g., is green) to allow an external force to actuate the control member. The locking clip 502 may be removed from the block 504 to uninstall the locking device 180. The locking clip 502 may be attached to the locking device 180 via a safety cord 564.

Figure 6A:
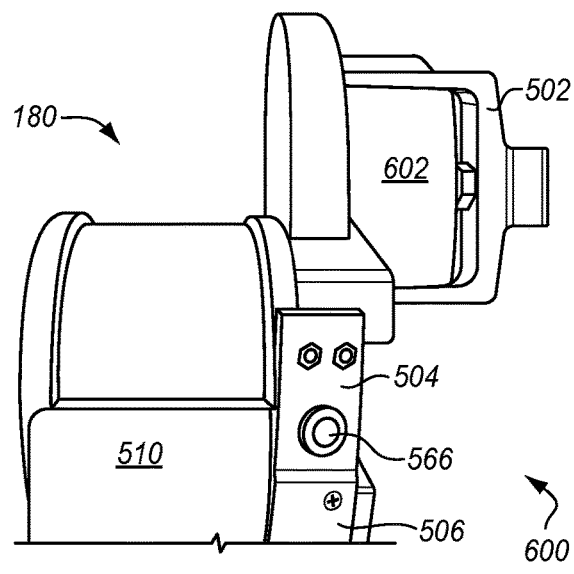
FIG. 6A is a top perspective view of a locking device in a stow position in an illustrative embodiment.
Figure 6B:
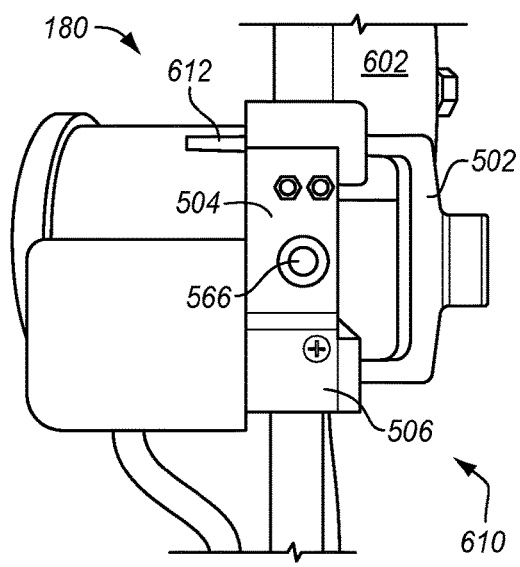
FIG. 6B is a top perspective view of a locking device in an installed position in an illustrative embodiment.

FIG. 6A is a top perspective view 600 of the locking device 180 in a stow position in an illustrative embodiment. In the stow position, the locking clip 502 is engaged with a stow member 602 of the locking device 180 at a position away from the locking clip interface 506. FIG. 6B is a top perspective view 610 of the locking device 180 in an installed position in an illustrative embodiment. In the installed position, the locking clip 502 is engaged with the locking clip interface 506 to couple with the shaft brake 510. A lockout tag may be installed to the locking clip 502 through a hole 612 of the locking clip 502.

Figure 6C:
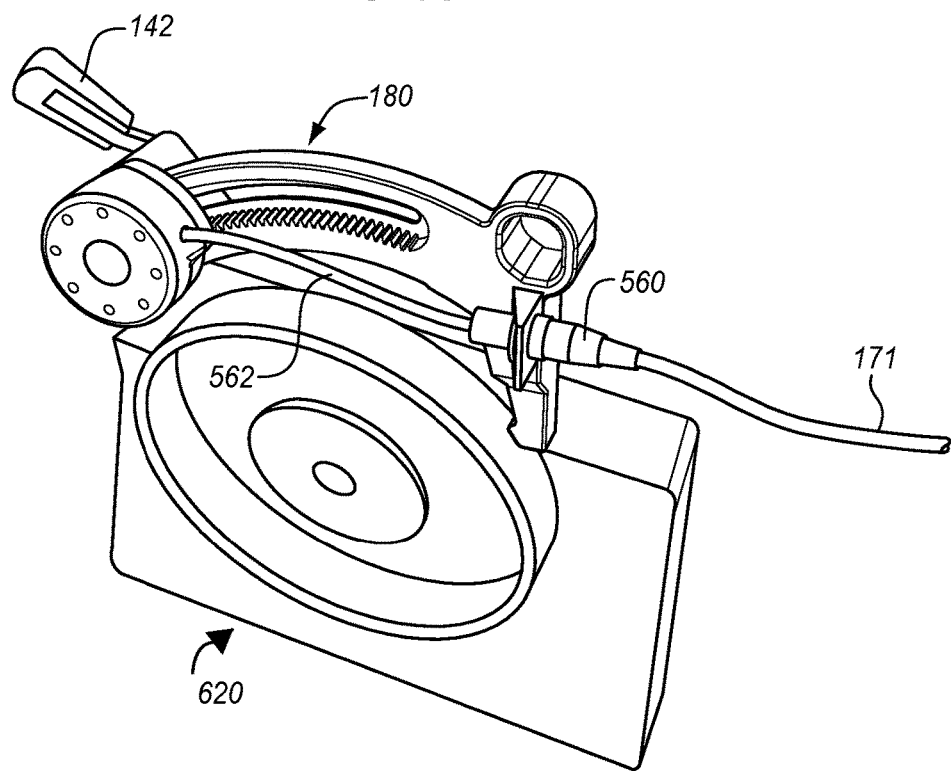
FIG. 6C illustrates a perspective view of a locking device removably installed with the speedbrake lever in an illustrative embodiment.

FIG. 6C illustrates a perspective view 620 of the locking device 180 removably installed with the speedbrake lever 142 in an illustrative embodiment. When power is supplied to the shaft brake 510 from the power cable 171 (e.g., via the power cable interface 560 and the power wire 562), the speedbrake lever 142 may move along the slide 530 to actuate flight control surfaces (e.g., spoilers 121-132). Otherwise, if power is not supplied to the shaft brake 510, the speedbrake lever 142 is prevented from moving along the slide 530 to actuate flight control surfaces. That is, the shaft brake 510 is configured to allow movement along the slide 530 (e.g., release the speedbrake lever 142 while still being engaged with the speedbrake lever 142) in response to receiving a power input, and to lock the speedbrake lever 142 in response to an absence of the power input. The locking device 180 thus provides a technical benefit by preventing inadvertent actuation of a control member such as a speedbrake lever 142 while flight control surfaces undergo maintenance procedures.

Figure 7A:
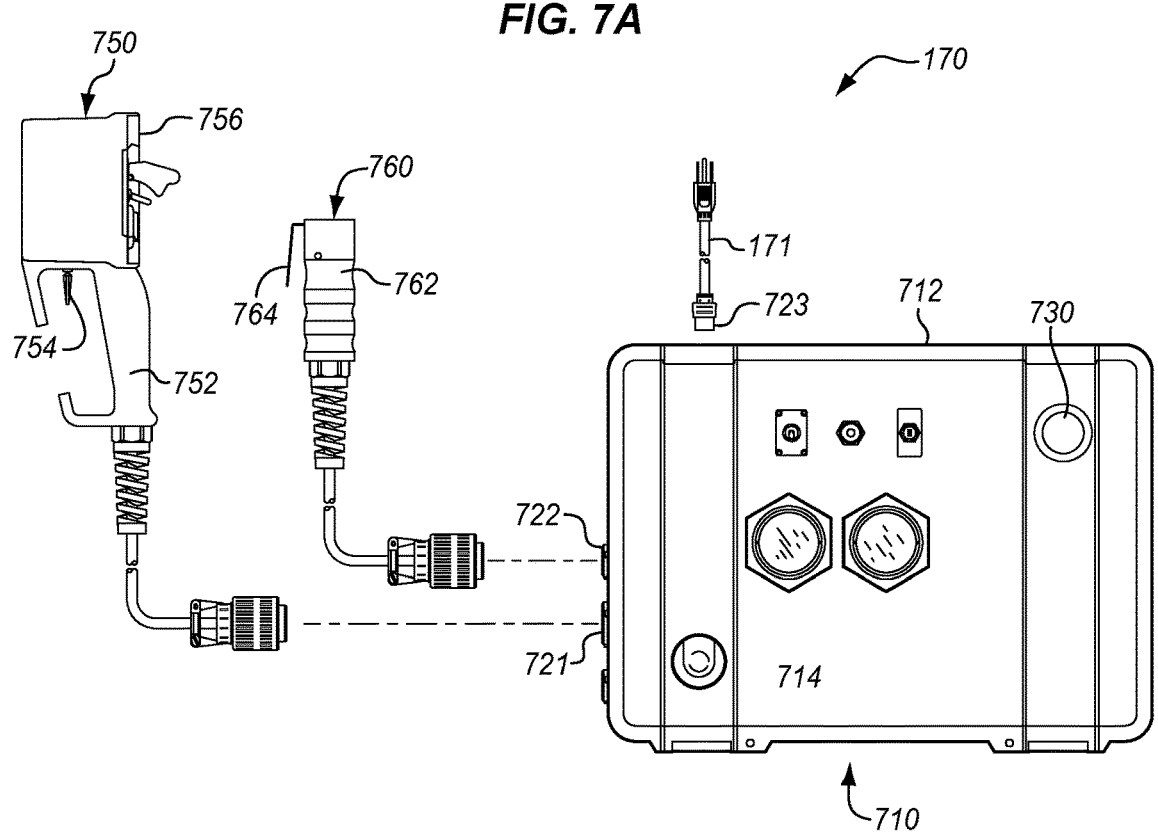
FIG. 7A illustrates a locking control unit in an illustrative embodiment.

FIG. 7A illustrates the locking control unit 170 in an illustrative embodiment. The locking control unit 170 includes a controller 710 having a housing 712, an antenna 714, a primary spotter cable interface 721, a secondary spotter cable interface 722, a power cable interface 723, and an LED indicator 730. The controller 710 receives signal input from the transmitter units 161-162 via the antenna 714, and also receives signal input from at least one of the primary spotter unit 750 and the secondary spotter unit 760 via the primary spotter cable interface 721 and the secondary spotter cable interface 722, respectively. It will be appreciated, however, that alternative connections and communication mediums may be implemented.

Figure 7B:
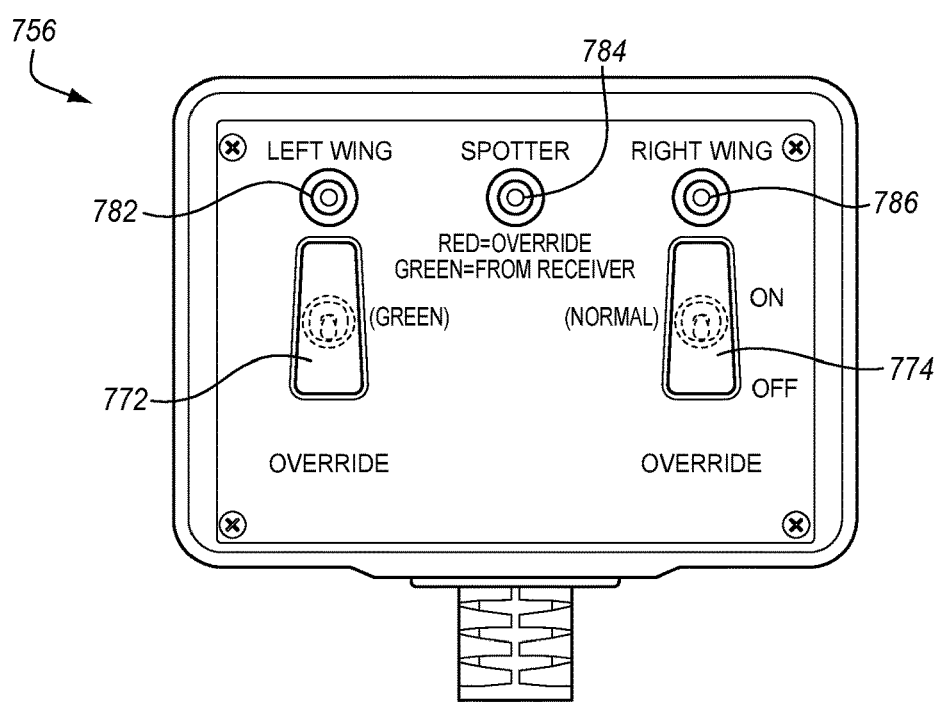
FIG. 7B illustrates a primary spotter interface in an illustrative embodiment.

The secondary spotter unit 760 includes a pendant body 762 and a trigger 764 that actuates a signal when pressed against the pendant body 762. The primary spotter unit 750 includes a handle 752, a trigger 754, and a primary spotter interface 756. FIG. 7B illustrates the primary spotter interface 756 in an illustrative embodiment. The primary spotter interface 756 includes a left override switch 772 and a right override switch 774. When actuated, the override switches 772/774 provide a substitute signal for one of the transmitter units 161-162 (e.g., the left override switch 772 for the first transmitter unit 161 and the right override switch 774 for the second transmitter unit 162).

The primary spotter interface 756 operated by the spotter (e.g., situated in the spotter zone 153 or similar area) may thus indicate to the controller 710 that safe conditions exist despite absence of a signal from one of the transmitter units 161-162. This enables, for example, a technician operating on a left wing of the aircraft 101 to safely work if the right wing technician is absent. The primary spotter interface 756 also includes a left wing indicator 782, a spotter indicator 784, and a right wing indicator 786 to enable the spotter to view which signals are currently indicating an active switch. Each of the override switches 772/774 and the triggers 754/764 may be momentary switches similar to that described above with respect to the handheld switches 201-202 and 251-252. The secondary spotter unit 760 may be provided for optional use by the spotter (e.g., instead of the primary spotter unit 750) if override functionality is unneeded and a smaller form factor is desirable for holding.

Figure 8:
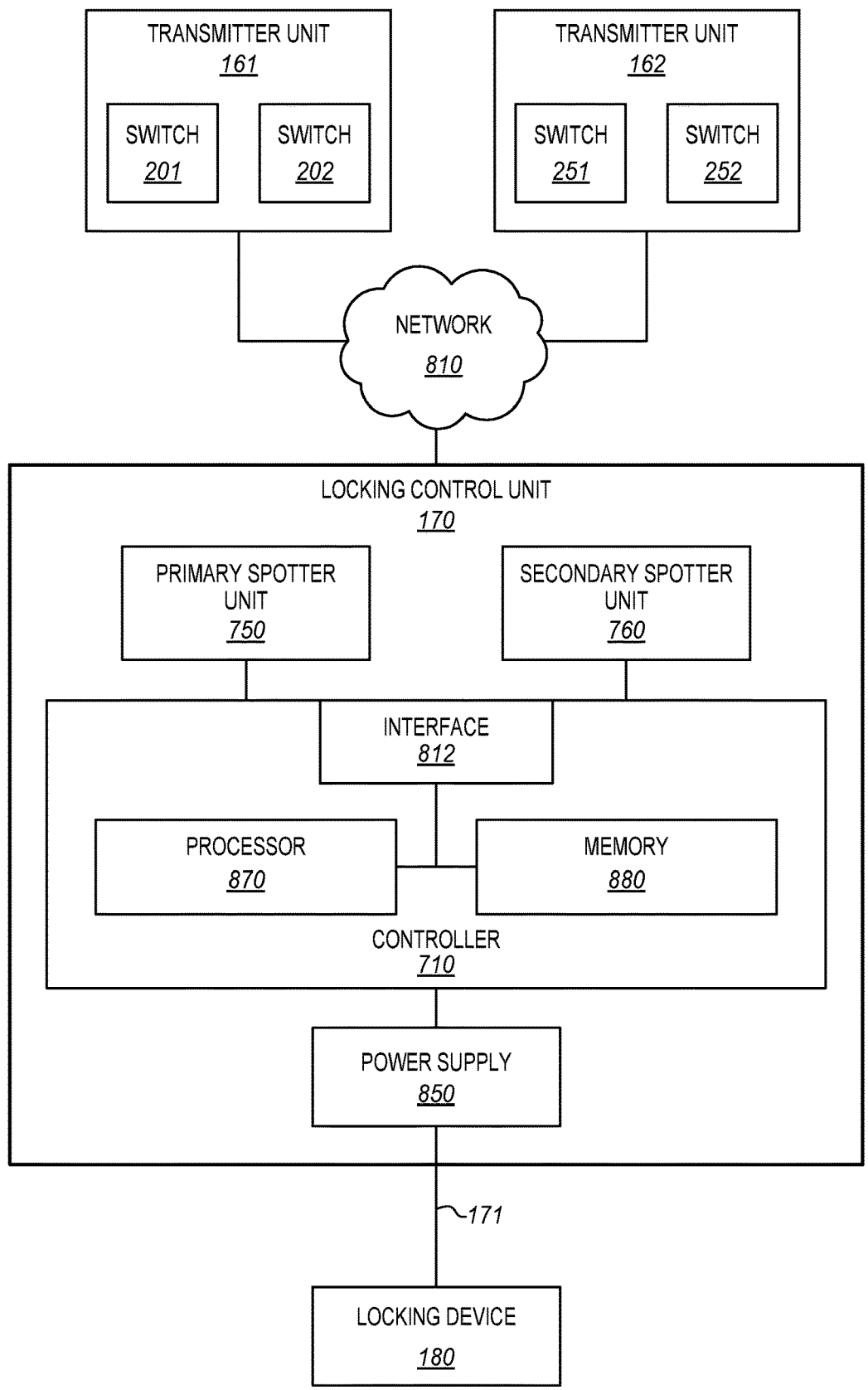
FIG. 8 is a block diagram of the locking control unit and the controller in an illustrative embodiment.

FIG. 8 is a block diagram of the locking control unit 170 and the controller 710 in an illustrative embodiment. The controller 710 is configured to receive a signal from the primary spotter unit 750 (or optionally the secondary spotter unit 760) and the transmitter units 161-162 via the interface 812 which may include any hardware component for a wired connection or a wireless connection. The interface 812 may communicate over a network 810 which is any suitable wired or wireless communication medium. The controller 710 is configured to direct a power supply 850 which may be local to the controller 710 (e.g., a 24 Volt DC power supply) or external to the controller 710 (e.g., a power system of the aircraft 101).

The controller 710 may comprise hardware, software, or a combination of hardware and software. For example, the controller 710 may include a processor 870, which includes any electronic circuits and/or optical circuits that are able to perform functions. The processor 870 may include one or more Central Processing Units (CPU), microprocessors, Digital Signal Processors (DSPs), Application-Specific Integrated Circuits (ASICs), Programmable Logic Devices (PLD), control circuitry, etc. Some examples of processors include Intel Core processors, Advanced Reduced Instruction Set Computing (RISC) Machines (ARM) processors, etc. The controller 710 may also include a memory 880, which may include any electronic circuits, optical circuits, and/or magnetic circuits that are able to store data.

FIG. 9 is a flowchart of a method 900 for controlling the locking device 180 in an illustrative embodiment. The steps of the method 900 will be described with reference to FIGS. 1-8, but those skilled in the art will appreciate that the method 900 may be performed in other systems. The steps of the flowchart(s) described herein are not all inclusive and may include other steps not shown. The steps described herein may also be performed in an alternative order.

In step 902, the locking device 180 engages with a control member inside a cockpit of an aircraft for motion restriction of the control member. As described above, the motion of the control member (e.g., speedbrake lever 142) is configured to control movement of a surface on a wing of the aircraft (e.g., spoilers 121-132).

In step 904, the first transmitter unit 161 transmits a first signal indicating whether both the first handheld switch 201 and the second handheld switch 202 are actively held in an on position. The first signal may indicate the status of the first handheld switch 201 and the second handheld switch 202 via data included in the signal. Alternatively, the first transmitter unit 161 may be configured to indicate the status by halting its transmission of the signal if either of the first handheld switch 201 and the second handheld switch 202 is not being actively held.

In step 906, the second transmitter unit 162 transmits a second signal indicating whether both the third handheld switch 251 and the fourth handheld switch 252 are actively held in an on position. The second signal may indicate the status of the third handheld switch 251 and the fourth handheld switch 252 via data included in the signal. Alternatively, the second transmitter unit 162 may be configured to indicate the status by halting its transmission of the signal if either of the third handheld switch 251 and the fourth handheld switch 252 is not being actively held.

In step 908, the primary spotter unit 750 transmits a third signal indicating whether the spotter switch is actively held in an on position. Alternatively or additionally, the third signal may be transmitted by a secondary spotter unit 760. The third signal may indicate the status of the primary spotter unit 750 (or the optional secondary spotter unit 760) via data included in the signal. Alternatively, the primary spotter unit 750 may be configured to indicate its status by halting its transmission of the signal if its trigger is not being actively held.

In step 910, the controller 710 determines whether the switches are being held. In doing so, the controller 710 may determine whether each of the first signal, second signal, and third signal is being actively received and/or whether each signal indicates that its corresponding switches are being actively held. The controller 710 may determine whether each switch is being actively held based on detecting/receiving the signal or by analyzing the data included in a received signal. If each switch is currently being held, the method 900 may proceed to step 912 where the controller 710 directs a supply of power to the locking device 180 for a duration corresponding with receiving the signals. Otherwise, power is not supplied to the locking device 180 and the control member is prevented from being accessed by a person in the cockpit of the aircraft.

In some embodiments, the controller 710 may be configured to actuate the supply of power to the locking device 180 in response to alternative numbers or combinations of signals. For example, the controller 710 may direct a release of the control member based on one signal or just the first signal and the third signal. Additionally, the first signal and the second signal may be provided by one of the override switches 772/774 instead of the first transmitter unit 161 the second transmitter unit 162, respectively.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A system comprising:
   a locking device configured to removably engage a control member inside a cockpit of an aircraft for motion restriction of the control member, wherein motion of the control member is configured to control movement of a surface on a wing of the aircraft;
   a first wireless transmitter configured to electronically couple with a first handheld switch and a second handheld switch, and to transmit a first signal indicating whether both the first handheld switch and the second handheld switch are actively held in an on position; and
   a controller configured to communicatively couple with the first wireless transmitter, to determine from the first signal that both the first handheld switch and the second handheld switch are actively held in the on position, and to direct a supply of power to the locking device for a duration corresponding with receiving the first signal indicating that both the first handheld switch and the second handheld switch are actively held in the on position;
   wherein the locking device is configured to release the motion restriction of the control member for the duration of receiving the supply of power.

2. The system of claim 1 wherein:
   the controller is configured, in response to determining from the first signal that at least one of the first handheld switch and the second handheld switch is not actively held in the on position, to halt the supply of power to the locking device; and
   the locking device is configured to impose the motion restriction of the control member when the supply of power is not received.

3. The system of claim 1 further comprising:
   a second wireless transmitter configured to electronically couple with a third handheld switch and a fourth handheld switch, and to transmit a second signal indicating whether both the third handheld switch and the fourth handheld switch are actively held in an on position; and
   a spotter switch configured to transmit a third signal indicating whether the spotter switch is actively held in an on position;
   wherein the controller is configured to communicatively couple with the second wireless transmitter and the spotter switch, to determine from the first signal, the second signal, and the third signal that each of the first handheld switch, the second handheld switch, the third handheld switch, the fourth handheld switch, and the spotter switch are actively held in the on position, and to direct a supply of power to the locking device for a duration corresponding with receiving each of the first signal, the second signal, and the third signal.

4. The system of claim 3 wherein:
   the controller is configured, in response to determining that one of the first handheld switch, the second handheld switch, the third handheld switch, the fourth handheld switch, and the spotter switch is not actively held in the on position, to halt the supply of power to the locking device; and
   the locking device is configured impose the motion restriction of the control member when the supply of power is not received.

5. The system of claim 4 wherein:
   the first wireless transmitter, the first handheld switch, and the second handheld switch are configured to attach to a first lift operable to position a first technician with respect to a first wing of the aircraft; and
   the second wireless transmitter, the third handheld switch, and the fourth handheld switch are configured to attach to a second lift operable to position a second technician with respect to a second wing of the aircraft.

6. The system of claim 1 wherein:
   the locking device includes a shaft brake configured to release the control member in response to receiving a power input, and to lock the control member in response to an absence of the power input.

7. The system of claim 1 wherein:
the control member is a speedbrake lever configured to operate a ground spoiler of the aircraft.

8. A method comprising:
engaging a locking device with a control member inside a cockpit of an aircraft for motion restriction of the control member, wherein motion of the control member is configured to control movement of a surface on a wing of the aircraft;
transmitting a first signal indicating whether both of a first handheld switch and a second handheld switch are actively held in an on position;
determining from the first signal that both of the first handheld switch and the second handheld switch are actively held in the on position;
directing a supply of power to the locking device for a duration corresponding with receiving the first signal indicating that both the first handheld switch and the second handheld switch are actively held in the on position; and
releasing the motion restriction of the control member for the duration of receiving the supply of power.

9. The method of claim 8 further comprising:
in response to determining from the first signal that at least one of the first handheld switch and the second handheld switch is not actively held in the on position:
halting the supply of power to the locking device; and
imposing the motion restriction of the control member with the locking device via absence of the supply of power at the locking device.

10. The method of claim 8 further comprising:
transmitting a second signal indicating whether both of a third handheld switch and a fourth handheld switch are actively held in an on position;
determining from the first signal and the second signal that each of the first handheld switch, the second handheld switch, the third handheld switch, and the fourth handheld switch are actively held in the on position; and
directing a supply of power to the locking device for a duration corresponding with receiving each of the first signal and the second signal.

11. The method of claim 10 further comprising:
transmitting a third signal indicating whether a spotter switch is actively held in an on position;
determining from the first signal, the second signal, and the third signal that each of the first handheld switch, the second handheld switch, the third handheld switch, the fourth handheld switch, and the spotter switch are actively held in the on position; and
directing a supply of power to the locking device for a duration corresponding with receiving each of the first signal, the second signal, and the third signal.

12. The method of claim 11 further comprising:
transmitting the third signal with a handheld spotter unit that includes the spotter switch; and
transmitting the second signal with an override switch on the handheld spotter unit.

13. The method of claim 11 further comprising:
in response to determining that one of the first handheld switch, the second handheld switch, the third handheld switch, the fourth handheld switch, and the spotter switch is not actively held in the on position:
halting the supply of power to the locking device; and
imposing the motion restriction of the control member with the locking device via absence of the supply of power at the locking device.

14. The method of claim 8 further comprising:
releasing the control member in response to receiving a power input; and
locking the control member in response to an absence of the power input.

15. A system comprising:
a locking device configured to removably engage a control member inside a cockpit of an aircraft for motion restriction of the control member, wherein motion of the control member is configured to control movement of a surface on a wing of the aircraft; and
a controller configured to receive a first signal and a second signal, wherein the first signal indicates whether both of a first handheld switch and a second handheld switch are actively held in an on position, and wherein the second signal indicates whether both of a third handheld switch and a fourth handheld switch are actively held in an on position;
wherein the controller is configured to direct the locking device to release the motion restriction if each of the first handheld switch, the second handheld switch, the third handheld switch, and the fourth handheld switch are actively held in the on position, and to direct the locking device to impose the motion restriction if any of the first handheld switch, the second handheld switch, the third handheld switch, and the fourth handheld switch are not actively held in the on position.

16. The system of claim 15 wherein:
the controller is configured to direct a supply of power to the locking device for a duration corresponding with receiving indication from the first signal and the second signal that each of the first handheld switch, the second handheld switch, the third handheld switch, and the fourth handheld switch are actively held in the on position; and
the locking device is configure to release the motion restriction in response to receiving the supply of power.

17. The system of claim 15 wherein:
the controller is configured to receive a third signal indicating whether a spotter switch is actively held in an on position, and in response to determining from the first signal, the second signal, and the third signal that each of the first handheld switch, the second handheld switch, the third handheld switch, the fourth handheld switch, and the spotter switch are actively held in the on position, to direct the locking device to release the motion restriction.

18. The system of claim 17 further comprising:
a handheld spotter unit that includes the spotter switch, and further includes an override switch operable to transmit the second signal to the controller.

19. The system of claim 15 wherein:
the locking device includes a shaft brake configured to release the control member in response to receiving a power input, and to lock the control member in response to an absence of the power input.

20. The system of claim 15 wherein:
the control member is a speedbrake lever configured to operate a ground spoiler of the aircraft.

* * * * *